US011692536B2

(12) United States Patent
Xu et al.

(10) Patent No.: US 11,692,536 B2
(45) Date of Patent: Jul. 4, 2023

(54) VACUUM PUMPING DEVICE AND FOOD PROCESSOR

(71) Applicant: GUANGDONG MIDEA CONSUMER ELECTRIC MANUFACTURING CO., LTD., Foshan (CN)

(72) Inventors: Jianfei Xu, Foshan (CN); Rong Liu, Foshan (CN); Dan Wu, Foshan (CN); Xianghe Zeng, Foshan (CN); Yan Tang, Foshan (CN)

(*) Notice: Subject to any disclaimer, the term of this patent is extended or adjusted under 35 U.S.C. 154(b) by 626 days.

(21) Appl. No.: 16/644,510

(22) PCT Filed: Aug. 7, 2018

(86) PCT No.: PCT/CN2018/099075
§ 371 (c)(1),
(2) Date: Mar. 5, 2020

(87) PCT Pub. No.: WO2019/169830
PCT Pub. Date: Sep. 12, 2019

(65) Prior Publication Data
US 2020/0284246 A1    Sep. 10, 2020

(30) Foreign Application Priority Data

Mar. 7, 2018 (CN) .......................... 201810190565.9
Mar. 7, 2018 (CN) .......................... 201810191056.9
(Continued)

(51) Int. Cl.
*A47J 19/00* (2006.01)
*A47J 43/00* (2006.01)
(Continued)

(52) U.S. Cl.
CPC .............. *F04B 37/14* (2013.01); *A47J 19/02* (2013.01); *A47J 43/046* (2013.01);
(Continued)

(58) Field of Classification Search
CPC .............................. A47J 19/02; A47J 43/043
See application file for complete search history.

(56) References Cited

U.S. PATENT DOCUMENTS

| 9,359,121 | B1 | 6/2016 | Hsieh | |
|---|---|---|---|---|
| 2004/0173105 | A1* | 9/2004 | Kim | B65B 31/047 99/472 |
| 2015/0201808 | A1* | 7/2015 | Katsuki | A23N 1/02 241/199.12 |

FOREIGN PATENT DOCUMENTS

| CN | 201899396 U | 7/2011 |
|---|---|---|
| CN | 202265056 U | 6/2012 |

(Continued)

OTHER PUBLICATIONS

Second OA of CN Application No. 201810191056.8.
(Continued)

*Primary Examiner* — Anshu Bhatia
(74) *Attorney, Agent, or Firm* — Kilpatrick Townsend & Stockton, LLP (57) ABSTRACT

The present disclosure provides a vacuum pumping device and a food processor. The vacuum pumping device includes an upper cover; a lower cover configured to cooperated with the upper cover to form a receiving cavity and including a connecting part at a lower portion of the lower cover, a wall of the receiving cavity defining an evacuation hole and an exhaust hole; a mounting support located in the receiving cavity and connected to the upper cover and/or the lower cover; a vacuum pump connected to the mounting support, and including an air inlet communicating with the evacuation hole and an air outlet communicating with the exhaust hole; a control circuit board connected to the mounting support and electrically connected to the vacuum pump; and
(Continued)

a power supply device located in the receiving cavity and electrically connected to the control circuit board.

4 Claims, 8 Drawing Sheets

(30) Foreign Application Priority Data

| Mar. 7, 2018 | (CN) | 201810191228.1 |
| Mar. 7, 2018 | (CN) | 201820318266.4 |
| Mar. 7, 2018 | (CN) | 201820318371.8 |
| Mar. 7, 2018 | (CN) | 201820318955.5 |

(51) Int. Cl.
*F04B 37/14* (2006.01)
*A47J 19/02* (2006.01)
*A47J 43/046* (2006.01)
*F04B 39/12* (2006.01)

(52) U.S. Cl.
CPC .......... *F04B 39/121* (2013.01); *F04B 39/127* (2013.01); *F04C 2240/40* (2013.01)

(56) References Cited

FOREIGN PATENT DOCUMENTS

| CN | 104153966 A | 11/2014 |
| CN | 205053888 U | 3/2016 |
| CN | 105982504 A | 10/2016 |
| CN | 106308575 A | 1/2017 |
| CN | 205994362 U | 3/2017 |
| CN | 106667229 A | 5/2017 |
| CN | 206166749 U | 5/2017 |
| CN | 206213951 U | 6/2017 |
| CN | 106974565 A | 7/2017 |
| CN | 206303794 U | 7/2017 |
| CN | 206403656 U | 8/2017 |
| CN | 107157356 A | 9/2017 |
| CN | 206565837 U | 10/2017 |
| CN | 107499567 A | 12/2017 |
| CN | 107499717 A | 12/2017 |
| CN | 107550330 A | 1/2018 |
| EP | 3286103 A1 | 2/2018 |
| KR | 101821786 B1 | 1/2018 |
| WO | 2016169274 A1 | 10/2016 |
| WO | 2017152192 A1 | 9/2017 |

OTHER PUBLICATIONS

First OA of KR Application No. 10-2020-7005508.
The first OA corresponding to CN Application No. 201810190565.9.
OA1 of CN Application No. 201810191228.A and search report.
Extended European Search Report pf 18908785.1.
The first Office Action of CN Application No. 201810191056.8.
International Search Report dated Nov. 23, 2018 in the corresponding International Application No. PCT/CN2018/099075.

* cited by examiner

VACUUM PUMPING DEVICE AND FOOD PROCESSOR

CROSS-REFERENCES TO RELATED APPLICATIONS

The present disclosure is a national phase application of International Application No. PCT/CN2018/099075, filed on Aug. 7, 2018, which claims the priorities of Chinese Application No. 201810190565.9, 201820318955.5, 201810191228.1, 201820318371.8, 201810191056.8 and 201820318266.4, filed with the Chinese Patent Office on Mar. 7, 2018, the entireties of which are herein incorporated by reference.

FIELD

The present disclosure relates to the field of food processors, and in particular, to a vacuum pumping device and a food processor using the vacuum pumping device.

BACKGROUND

Many ingredients are susceptible to spoilage due to being oxidized or bacteria-infested after coming in contact with the air. For example, juice is easily oxidized in contact with the air, which affects the taste of the juice. Therefore, some ingredients need to be isolated from the air.

In the existing food processor with an evacuation function, the vacuum pumping device is generally fixed to the machine base, which makes the overall structure of the vacuum pumping device more complicated, and makes the process of assembling the vacuum pumping device more difficult.

SUMMARY

Embodiments of the present disclosure are to provide a vacuum pumping device, which aims to simplify the structure of the vacuum pumping device, improve the convenience of assembling the vacuum pumping device, and improve the structural stability.

Embodiments of the present disclosure provide a vacuum pumping device, including:

an upper cover;

a lower cover configured to cooperate with the upper cover to form a receiving cavity and including a connecting part at a lower portion of the lower cover, a wall of the receiving cavity defining an evacuation hole and an exhaust hole;

a mounting support located in the receiving cavity and connected to the upper cover and/or the lower cover;

a vacuum pump connected to the mounting support, and including an air inlet communicating with the evacuation hole; and an air outlet communicating with the exhaust hole;

a control circuit board connected to the mounting support and electrically connected to the vacuum pump; and a power supply device located in the receiving cavity and electrically connected to the control circuit board.

In one embodiment, the mounting support is configured to divide the receiving cavity into: an upper cavity, the control circuit board and the power supply device being both located in the upper cavity; and a lower cavity, the vacuum pump being located in the lower cavity and clamped and fixed by the lower cover and the mounting support; and/or the mounting support is detachably connected to the upper cover and/or the lower cover.

In one embodiment, the mounting support includes: a first mounting structure on a side of the mounting support towards the upper cover; and a second mounting structure on a side of the mounting support towards the lower cover. The upper cover includes a first locking structure, the mounting support being detachably connected to the upper cover through the cooperation of the first mounting structure and the first locking structure; and the lower cover includes a second locking structure, the mounting support being detachably connected to the lower cover through the cooperation of the second mounting structure and the second locking structure.

In one embodiment, the mounting support includes a base plate; the first mounting structure includes first buckles protruding from a side of the base plate towards the upper cover; and the first locking structure includes first buckle slots formed at an inner wall surface of the upper cover, each of the first buckles being inserted into one corresponding first buckle slot.

In one embodiment, the vacuum pumping device further includes a connecting member. The first mounting structure further includes a first connecting post protruding from the side of the base plate towards the upper cover, the first connecting post including a first connecting hole formed therein; and the first locking structure further includes a first locking hole formed at the upper cover, the connecting member being configured to fit in the first connecting hole and the first locking hole.

In one embodiment, the second mounting structure includes second buckles protruding from a side of the base plate towards the lower cover; and the second locking structure includes second buckle slots formed at an inner wall surface of the lower cover, each of the second buckles being inserted into one corresponding second buckle slot.

In one embodiment, the vacuum pumping device further includes a connecting member. The second mounting structure further includes a connecting cylinder protruding from a side of the base plate towards the lower cover; the base plate includes a second locking hole communicating with the connecting cylinder; and the second locking structure further includes a second connecting post protruding from an inner wall surface of the lower cover, the second connecting post including a second connecting hole formed therein, and the connecting member being configured to fit in the second connecting hole and the second locking hole.

In one embodiment, the lower cover includes the evacuation hole; and the upper cover or the lower cover includes the exhaust hole.

In one embodiment, the vacuum pumping device further includes a pressure relief switch assembly received in the receiving cavity. The lower cover further includes a pressure relief hole; and the upper cover or the lower cover includes an inlet hole, the pressure relief switch assembly being fixedly connected to the mounting support and configured to communicate with the pressure relief hole and the inlet hole.

In one embodiment, the vacuum pumping device further includes a check valve between the air inlet of the vacuum pump and the evacuation hole, the check valve being configured to communicate the air inlet with the evacuation hole and guide air flow in the direction from the evacuation hole to the air inlet.

In one embodiment, the vacuum pumping device further includes a sealing ring. The sealing ring is configured to: cover and seal a container to be evacuated, connect to the lower cover, and surround the exhaust hole.

In one embodiment, the connecting part is a connecting ring protruding from a surface of the lower cover opposite to the upper cover, the connecting ring being surrounding a periphery of the evacuation hole, and the sealing ring being sleeved outside the connecting ring; or the lower cover includes an annular clamp slot concavely formed at a surface of the lower cover opposite to the upper cover, the annular clamp slot being surrounding a periphery of the evacuation hole, and the sealing ring being embedded in the annular clamp slot.

In one embodiment, the lower cover includes an isolation and storage cavity formed at an outer wall of a bottom of the lower cover, and configured to communicate with the evacuation hole and a container to be evacuated.

In one embodiment, the vacuum pumping device further includes a cover plate detachably connected with the lower cover and including a screen hole communicating with the isolation and storage cavity. The lower cover includes a groove body formed at a surface of the lower cover opposite to the upper cover and inside the connecting part, an opening of the groove body being covered by the cover plate to form the isolation and storage cavity; and the evacuation hole is formed at a bottom wall of the groove body.

In one embodiment, the screen hole is in an elongated shape; and a width of the screen hole is defined as B, and B is greater than 0 and less than or equal to 0.8 mm.

In one embodiment, a distance between the cover plate and the bottom wall of the groove body is L, and L is greater than 1 mm and less than or equal to 10 mm.

The present disclosure further provides a food processor, including a stirring cup assembly, including: a cup body including an inner cavity; and a cup cover covering an upper end of the cup body, and including an opening communicating with the inner cavity of the cup body; and a vacuum pumping device detachably mounted on the cup cover and including:

an upper cover;

a lower cover configured to cooperated with the upper cover to form a receiving cavity and including a connecting part at a lower portion of the lower cover, a wall of the receiving cavity defining an evacuation hole and an exhaust hole;

a mounting support located in the receiving cavity and connected to the upper cover and/or the lower cover;

a vacuum pump connected to the mounting support, and including an air inlet communicating with the evacuation hole; and an air outlet communicating with the exhaust hole;

a control circuit board connected to the mounting support and electrically connected to the vacuum pump; and a power supply device located in the receiving cavity and electrically connected to the control circuit board; the connecting part is configured to communicate with an inner cavity of the cup body through the opening.

In one embodiment, the vacuum pumping device further includes a cover plate detachably connected with the lower cover and including a screen hole communicating with an isolation and storage cavity; the lower cover includes a groove body formed at a surface of the lower cover opposite to the upper cover and inside the connecting part, an opening of the groove body being covered by the cover plate to form the isolation and storage cavity; and the evacuation hole is formed at a bottom wall of the groove body.

In one embodiment, the vacuum pumping device further includes a sealing ring. The sealing ring is configured to: cover and seal a container to be evacuated, connect to the connecting part, and surround the exhaust hole; and an area of the opening is defined as S1; an area surrounded by a connecting ring on the lower cover for mounting the sealing ring is defined as S2; an area surrounded by the sealing ring is defined as S3; and S1 is greater than S2 and less than S3.

In one embodiment, the cup cover includes a groove; the opening is formed at a bottom of the groove; and a peripheral edge of the sealing ring is abutted against a wall of the groove.

According to embodiments of the present disclosure, the mounting support of the vacuum pumping device is connected to the upper cover and/or the lower cover, so that the upper cover and the lower cover cooperate to form a receiving cavity, and the vacuuming pump is installed and fixed by means of the mounting support. As such, during the assembling process of the vacuum pumping device, components such as the vacuum pump, the control circuit board, the power supply device, etc., can be modularly assembled with the help of the mounting support, then the upper cover and the lower cover are assembled by means of the mounting support. In this way, the overall assembly efficiency is improved, and depending on the fixing method of the mounting support, the structural stability of the internal components of the entire vacuum pumping device, such as the vacuum pump, the control circuit board, and the power supply device, can also be guaranteed, and the structural stability is high.

BRIEF DESCRIPTION OF THE DRAWINGS

In order to illustrate the embodiments of the present disclosure, the drawings used in the embodiments or the related art will be briefly described below. The drawings in the following description are only some embodiments of the present disclosure.

DESCRIPTION OF REFERENCE NUMERALS

TABLE 1

| Label | Name |
|-------|------|
| 300 | Food processor |
| 200 | Stirring cup assembly |
| 210 | Stirring cup |
| 220 | Cup cover |
| 221 | Opening |
| 100 | Vacuum pumping device |
| 110 | Upper cover |
| 111 | First buckle slot |

TABLE 1-continued

| Label | Name |
|---|---|
| 112 | First locking hole |
| 110a | Receiving cavity |
| 110b | Lower cavity |
| 110c | Upper cavity |
| 110d | Exhaust hole |
| 120 | Mounting support |
| 121 | Base plate |
| 122 | First buckle |
| 123 | First connecting post |
| 124 | Second buckle |
| 125 | Connecting cylinder |
| 130 | Lower cover |
| 131 | Second buckle slot |
| 132 | Second connecting post |
| 130a | Evacuation hole |
| 130b | Pressure relief hole |
| 133 | connecting part |
| 133a | Isolation and storage cavity |
| 140 | Vacuum pump |
| 150 | Control circuit board |
| 160 | Power supply device |
| 170 | Pressure relief valve assembly |
| 180 | Sealing ring |
| 190 | Cover plate |
| 191 | Screen hole |

DETAILED DESCRIPTION OF THE DISCLOSURE

Embodiments of the present disclosure will be described in the following with reference to the accompanying drawings.

It is to be understood that, all of the directional instructions in the embodiments of the present disclosure (such as up, down, left, right, front, rear . . . ) can only be used for explaining relative position relations, moving condition of the elements under a form as described in the figures, and so on, if the form changes, the directional instructions changes accordingly.

In the present disclosure, unless specified or limited otherwise, the terms "connected", "fixed" and the like are used broadly. In one embodiment, "fixed" can be fixed connections, detachable connections, or integral connections; may also be mechanical or electrical connections; may also be direct connections or indirect connections via intervening structures, may also be inner connecting of two elements, or interaction relationship between two elements.

In addition, the descriptions, such as the "first", the "second" in the embodiment of present disclosure, can only be used for describing the aim of description, and may not be understood as indicating or suggesting relative importance or impliedly indicating the number of the indicated feature. Therefore, the feature indicated by the "first", the "second" can express or impliedly include at least one feature.

The present disclosure provides a vacuum pumping device 100.

Referring to FIG. 1 to FIG. 6, the vacuum pumping device 100 of the present disclosure is detachably connected to a container to be evacuated, and can perform evacuating treatment on the inside of the container. The vacuum pumping device 100 includes an upper cover 110, a mounting support 120, a lower cover 130, a vacuum pump 140, a control circuit board 150, and a power supply device 160. One side of the mounting support 120 is detachably connected to the upper cover 110, and the lower cover 130 is detachably connected to the other side of the mounting support 120. The lower cover 130 is configured to cooperate with the upper cover 110 to form a receiving cavity 110a. A wall of the receiving cavity 110a defines an evacuation hole 130a and an exhaust hole 110d. The vacuum pump 140 is fixed and connected to the mounting support 120, an air inlet of the vacuum pump 140 is configured to communicate with the evacuation hole 130a, and an air outlet of the vacuum pump 140 is configured to communicate with the exhaust hole 110d. The control circuit board 150 is fixed and connected to the mounting support 120 and electrically connected to the vacuum pump 140. The power supply device 160 is located in the receiving cavity 110a and electrically connected to the control circuit board 150. It should be noted that the mounting support 120 may only be detachably connected to the upper cover 110 or may be detachably connected only to the lower cover 130.

It should be noted that the lower cover 130 includes a connecting part 133 at a lower portion of the lower cover 130. The connecting part 133 is configured to connect with other containers that need to be evacuated, so that the evacuating process is simpler, and the connecting process is more convenient and reliable.

The mounting support 120 is detachably connected to the upper cover 110 and/or the lower cover 130. It can be understood that the upper cover 110 may be detachably connected or fixedly connected to the lower cover 130 and the mounting support 120, such as integrally connected. The present embodiment may adopt a detachable connection manner.

The upper cover 110, the lower cover 130, and the mounting support 120 of the present disclosure may be made of a plastic material, or a metal material such as an aluminum alloy. The entire vacuum pumping device 100 is in a substantially cylindrical shape, that is, the upper cover 110 and the lower cover 130 are both cylindrical with a cover plate at one end, and the cross-sectional shape of the vacuum pumping device 100 may be circular, square, or polygonal. In one embodiment, the shape of the vacuum pumping device 100 may also be other structures, such as a spherical shape, that is, the upper cover 110 and the lower cover 130 are both hemispherical. The lower cover 130 includes an evacuation hole 130a. During the assembling process of the vacuum pumping device 100, the upper cover 110 and the lower cover 130 are fixedly connected together through the mounting support 120. In addition, the control circuit board 150 and the vacuum pump 140 (including the pump body and the driving motor) are both installed by means of the mounting support 120. The power supply device 160 may be a device to store electrical energy, such as a power supply lithium battery, a dry battery, etc., provided in the receiving cavity 110a, and it may also be a power supply interface, such as a USB interface, a power interface with a pin, provided in the receiving cavity 110a and the upper cover 110 or the lower cover 130 includes a corresponding opening 221. When the power supply device 160 is a device to store electrical energy, the vacuum pumping device 100 does not need an external power source. When the power supply device 160 is a power interface, the power supply device 160 can also be connected to the transformed mains power. A sealing structure may be provided between the container and the vacuum pumping device 100. The sealing structure may be provided on the container or on the vacuum pumping device 100, and the sealing structure may be a sealing ring 180 provided on the container or on the vacuum pumping device 100. In one embodiment, the connecting part 133 of the present disclosure is a connecting ring 133 protruding from a surface of the lower cover 130 opposite to the upper cover 110. The connecting ring 133 is surrounding a periphery of the evacuation hole 130a. The sealing ring 180 is sleeved outside the connecting ring 133; or an annular clamp slot (not shown) is recessed on a surface of the lower cover 130 opposite to the upper cover 110. The annular clamp slot is surrounding a periphery of the evacuation hole 130a, and the sealing ring 180 is embedded in the annular clamp slot. During the use of the vacuum pumping device 100, the vacuum pumping device 100 is directly placed at the opening 221 of the container, and the lower cover 130 overlaps the edge of the opening 221 of the container. When the vacuum pumping device 100 is started, the air in the container driven by the vacuum pump 140 enters through the evacuation hole 130a and is exhausted through the exhaust hole 110d. When the evacuation is finished, the vacuum pumping device 100 and the container can be directly separated and placed separately.

In the present disclosure, the mounting support 120 of the vacuum pumping device 100 is connected to the upper cover 110 and/or the lower cover 130, so that the upper cover 110 and the lower cover 130 cooperate to form the receiving cavity 110a, and the vacuuming pump 140 is installed and fixed by means of the mounting support 120. As such, during the assembling process of the vacuum pumping device 100, components such as the vacuum pump 140, the control circuit board 150, the power supply device 160, etc. can be modularly assembled with the help of the mounting support 120, and then the upper cover 110 and the lower cover 130 are assembled by means of the mounting support 120. In this way, the overall assembly efficiency is improved, and depending on the fixing method of the mounting support 120, the structural stability of the internal components of the entire vacuum pumping device 100, such as the vacuum pump 140, the control circuit board 150, and the power supply device 160, can also be guaranteed, and the structural stability is high.

Further, the mounting support 120 of the present disclosure is configured to divide the receiving cavity 110a into an upper cavity 110c and a lower cavity 110b. The vacuum pump 140 is located in the lower cavity 110b and is clamped and fixed by the lower cover 130 and the mounting support 120. The control circuit board 150 and the power supply device 160 are both located in the upper cavity 110c.

The evacuation hole 130a of the vacuum pumping device 100 is provided on the upper cover 130. The vacuum pumping device 100 of the present disclosure includes a mounting support 120 to divide the receiving cavity 110a into two parts, an upper cavity 110c and a lower cavity 110b. The vacuum pump 140, the control circuit board 150, and the power supply device 160 are reasonably arranged. Since the vacuum pump 140 is exposed to water vapor during the pumping process, the vacuum pump 140 is provided in the lower cavity 110b, and the control circuit board 150 and the power supply device 160 are provided in the upper cavity 110c. This arrangement can minimize the influence of water vapor and other factors on the control circuit board 150 and the power supply device 160 during the use of the vacuum pumping device 100. The vacuum pump 140 is relatively heavy, and the vacuum pump 140 is provided in the lower cavity 110b, which can also move the center of gravity of the vacuum pumping device 100 downward, and the entire structure can be more stable when the vacuum pumping device 100 is placed in a container.

In one embodiment, in order to improve the convenience of assembling the entire vacuum pumping device 100, a first mounting structure is provided on a side of the mounting support 120 towards the upper cover 110. The upper cover 110 is provided with a first locking structure. The mounting support 120 is detachably connected to the upper cover 110 through the cooperation of the first mounting structure and the first locking structure. A second mounting structure is provided on a side of the mounting support 120 towards the lower cover 130. The lower cover 130 includes a second locking structure. The mounting support 120 is detachably connected to the lower cover 130 through the cooperation of the second mounting structure and the second locking structure.

The mounting support 120 of the present disclosure includes a base plate 121. The first mounting structure includes first buckles 122 protruding from a side of the base plate 121 towards the upper cover 110. The first locking structure includes first buckle slots 111 provided on an inner wall surface of the upper cover 110. Each of the first buckles 122 is inserted into one corresponding first buckle slot 111.

The first mounting structure further includes a first connecting post 123 protruding from a side of the base plate 121 towards the upper cover 110. A first connecting hole is formed at the first connecting post 123. The first locking structure further includes a first locking hole 112 formed at the upper cover 110. The first connecting hole is cooperatively communicating with the first locking hole 112 through a connecting member.

The second mounting structure includes second buckles 124 protruding from a side of the base plate 121 towards the lower cover 130. The second locking structure includes second buckle slots 131 provided on an inner wall surface of the lower cover 130. Each of the second buckles 124 is inserted into one corresponding second buckle slot 131.

The second mounting structure further includes a connecting cylinder 125 protruding from a side of the base plate 121 towards the lower cover 130. The base plate 121 is provided with a second locking hole communicating with the connecting cylinder 125. The second locking structure further includes a second connecting post 132 protruding from an inner wall surface of the lower cover 130. A second connecting hole is formed at the second connecting post 132. The second connecting hole is cooperatively communicating with the second locking hole through a connecting member.

The upper cover 110 of the present disclosure is detachably connected to the mounting support 120 through the cooperation of the first mounting structure and the first locking structure. During the process of assembling the upper cover 110 and the mounting support 120, the cooperation of the first buckle 122 and the first buckle slot 111 can provide a preliminary fixed positioning for the assembly of the upper cover 110 and the mounting support 120. First buckles 122 and the first buckle slots 111 may be provided spaced. The power supply device 160 and the control circuit board 150 are first fixed on the mounting support 120. The mounting support 120 is provided with limiting ribs. The plurality of limiting ribs can clamp and fix the power supply device 160 and the control circuit board 150, and can be further fixed by screws. Next, align the first buckle 122 and the first buckle slot 111 to realize the preliminary fixing of the upper cover 110 and the mounting support 120. Then, through the cooperation of the connecting member (screw), the first connecting hole and the first locking hole 112, the upper cover 110 and the mounting support 120 can be fixed and assembled.

The lower cover 130 is detachably connected to the mounting support 120 through the cooperation of the second mounting structure and the second locking structure. The cooperation of the second buckle 124 and the second buckle slot 131 provides a preliminary fixed positioning for the process of assembling the lower cover 130 and the mounting support 120. Second buckles 124 and the second buckle slots 131 may be provided spaced. The vacuum pump 140 is clamped and fixed. The mounting support 120 or the lower cover 130 may be provided with a mounting groove, and the vacuum pump 140 is embedded in the mounting groove. Then, through the cooperation of the connecting member (screw), the second connecting hole and the second locking hole, the lower cover 130 and the mounting support 120 can be fixed and assembled.

As can be seen, in the present disclosure, the connecting structures cooperating with the upper cover 110 and the lower cover 130 are respectively provided on both sides of the mounting support 120, and the process of assembling the vacuum pumping device 100 is simplified, and the structural stability of the entire vacuum pumping device 100 is also improved.

The inside of the vacuum pumping device 100 of the present disclosure is sequentially communicated with an evacuation hole 130a, a vacuum pump 140, a receiving cavity 110a, and an exhaust hole 110d provided on the lower cover 130 to form an evacuation gas path. The exhaust hole 110d may be provided in the upper cover 110 or the lower cover 130. A gap may be provided between the mounting support 120 and the inner wall of the upper cover 110 or the lower cover 130, and the gap forms the exhaust hole 110d. The exhaust hole 110d may also be separately disposed in the lower cover 130 so that the exhaust hole 110d communicating with the receiving cavity 110a is configured to communicate with the exhaust port of the vacuum pump 140. In one embodiment, the mounting support 120 includes a hollow hole so that the exhaust port of the vacuum pump 140 located at the lower part communicates with the exhaust hole 110d. Such a structural setting makes the air circuit design of the vacuum pumping device 100 relatively simple. At the same time, during the exhaust process, the heat of electronic components such as the vacuum pump 140 and the control circuit board 150 can be taken away by the air flow. It should be noted that since the gap or the hollow hole is located on the edge of the mounting support 120, it is not easy to stay on the control circuit board 150 and the power supply device 140 even if part of the airflow flows. In the present disclosure, a waterproof partition may be protruded on the side of the base plate 121 towards the upper cover 110 and near the edge of the mounting support 120 to prevent the air current with water vapor from rushing directly to the power supply device 140 and the control circuit board 150. In order to ensure the stability of the vacuum pumping device 100 of the present disclosure during the operation, the evacuation hole 130a may be covered with a layer of air-permeable and waterproof material, so that during the evacuation process, the ingredients are not easily brought into the evacuation hole 130a and cause the blockage of the vacuum air path. Further, a check valve between the air inlet of the vacuum pump 140 and the evacuation hole 130a is configured to communicate the air inlet with the evacuation hole and guide air flow in a direction from the evacuation hole 130a to the air inlet.

In other evacuation gas paths, a ventilation pipe structure may also be formed inside the mounting support 120, and the ventilation pipe extends all the way and penetrates through the edge of the mounting support 120. In addition, the opening 221 of the ventilation pipe at the edge of the mounting support 120 communicates with the exhaust hole 110d at the upper cover 110 or the lower cover 130. The exhaust port of the vacuum pump 140 directly communicates with the other end opening 221 of the ventilation pipe structure on the mounting support 120. This can make the air circuit structure of the entire vacuum pumping device 100 simpler.

Further, the lower cover 130 further includes a pressure relief hole 130b. A pressure relief switch assembly is also received in the receiving cavity 110a. The upper cover 110 or the lower cover 130 includes an inlet hole. The pressure relief switch assembly is fixedly connected to the mounting support 120 and is configured to communicate with the pressure relief hole 130b and the inlet hole.

In the present disclosure, the pressure relief air path includes the pressure relief hole 130b, an air inlet hole, and a pressure relief valve assembly 170. The pressure relief valve assembly 170 may include a pressure relief valve and some pipelines. The pressure relief hole 130b and the evacuation hole 130a are spaced apart, and the air inlet hole may be separated from the exhaust hole 110d or may be shared. Besides, in the present disclosure, the upper cover 110 is also provided with a start button corresponding to the vacuum pump 140 and the pressure relief valve. By forming a pressure relief gas path, when the vacuum pumping device 100 realizes the vacuuming operation on the container and further processes the ingredients, the pressure relief valve can be activated by pressing the start button of the pressure relief valve on the upper cover 110. As such, the entry of external air and the internal and external balance of the pressure in the container are achieved, so that the pressure relief valve is easily removed.

Figure 1:
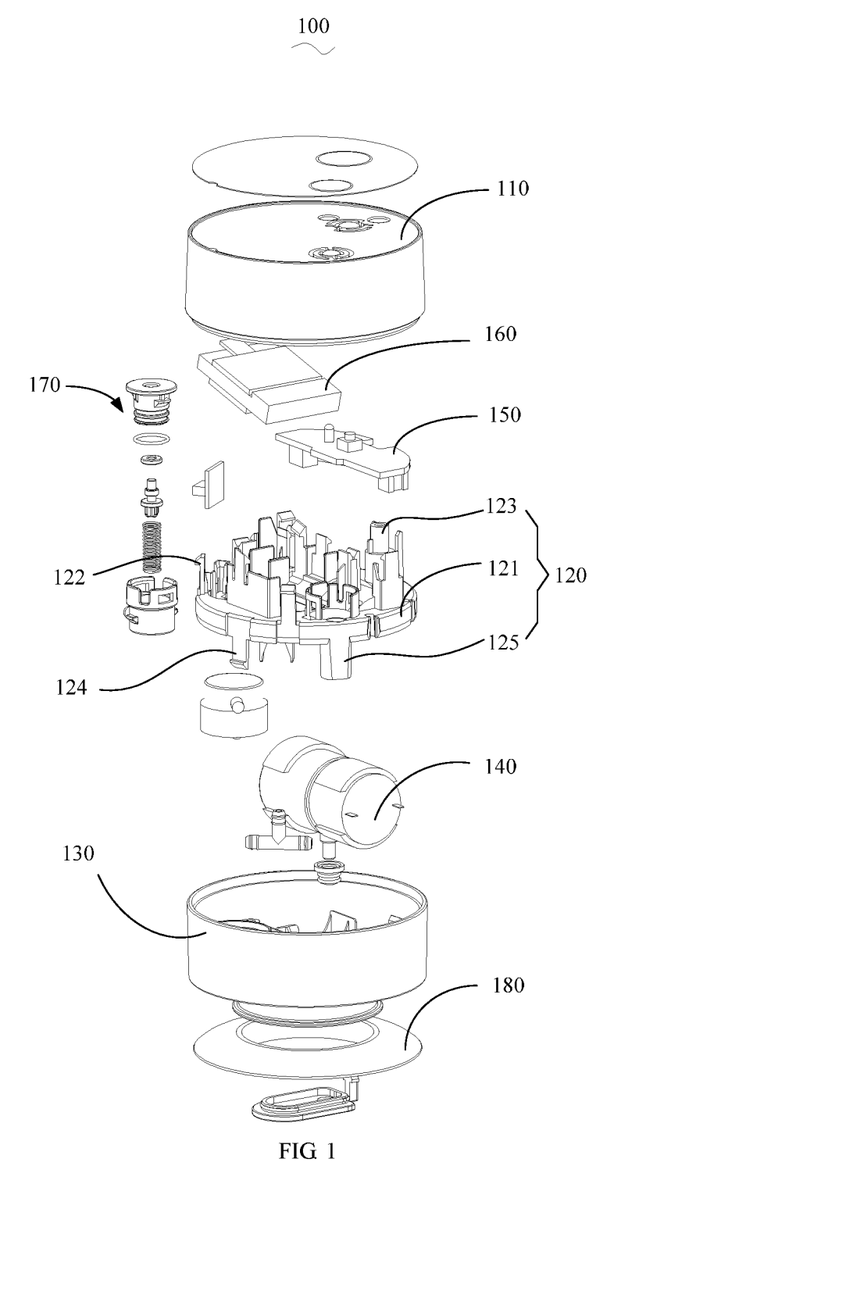
FIG. 1 is an exploded structural diagram of a vacuum pumping device according to an embodiment of the present disclosure.
Figure 2:
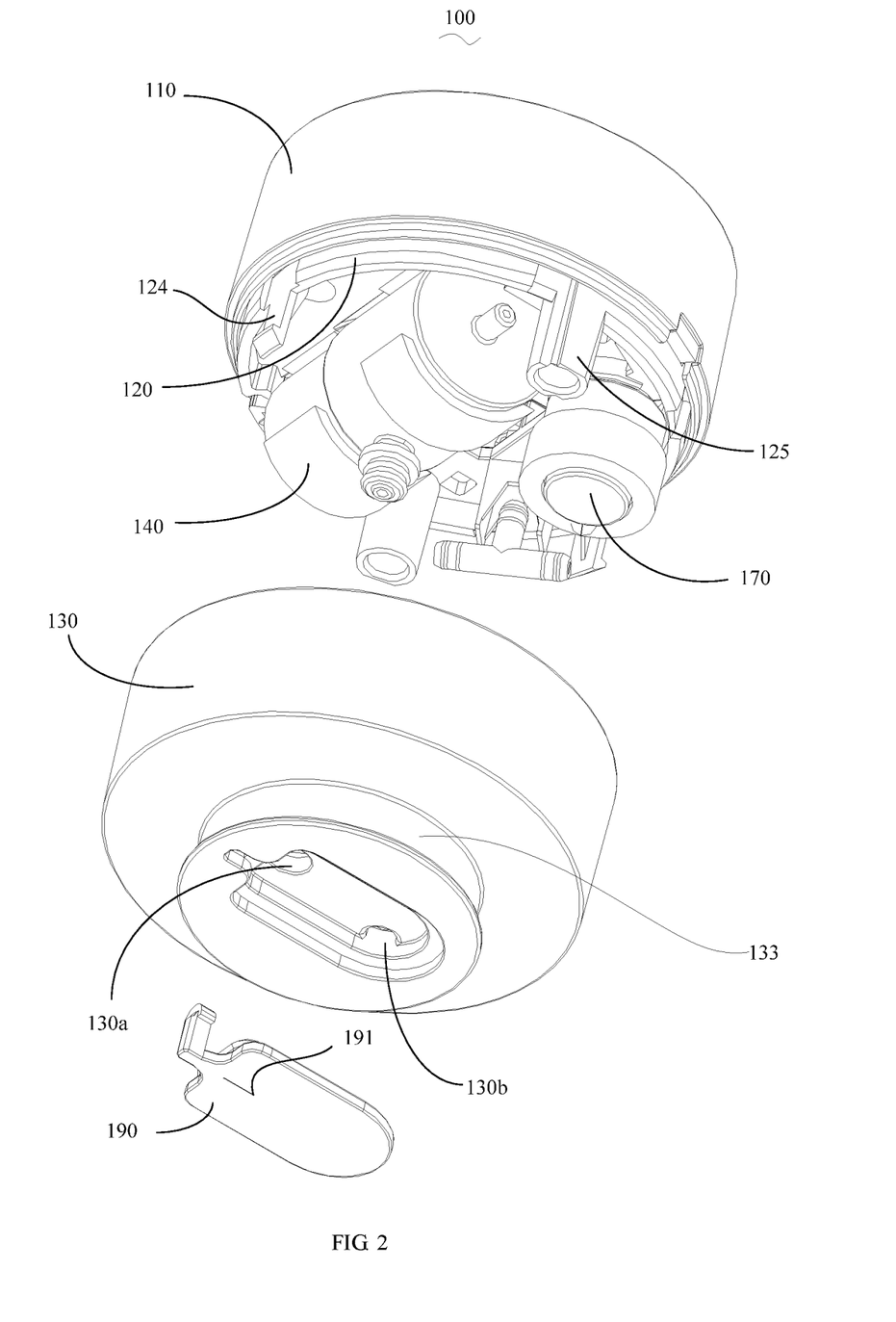
FIG. 2 is a partial exploded structural diagram of the vacuum pumping device in FIG. 1.
Figure 3:
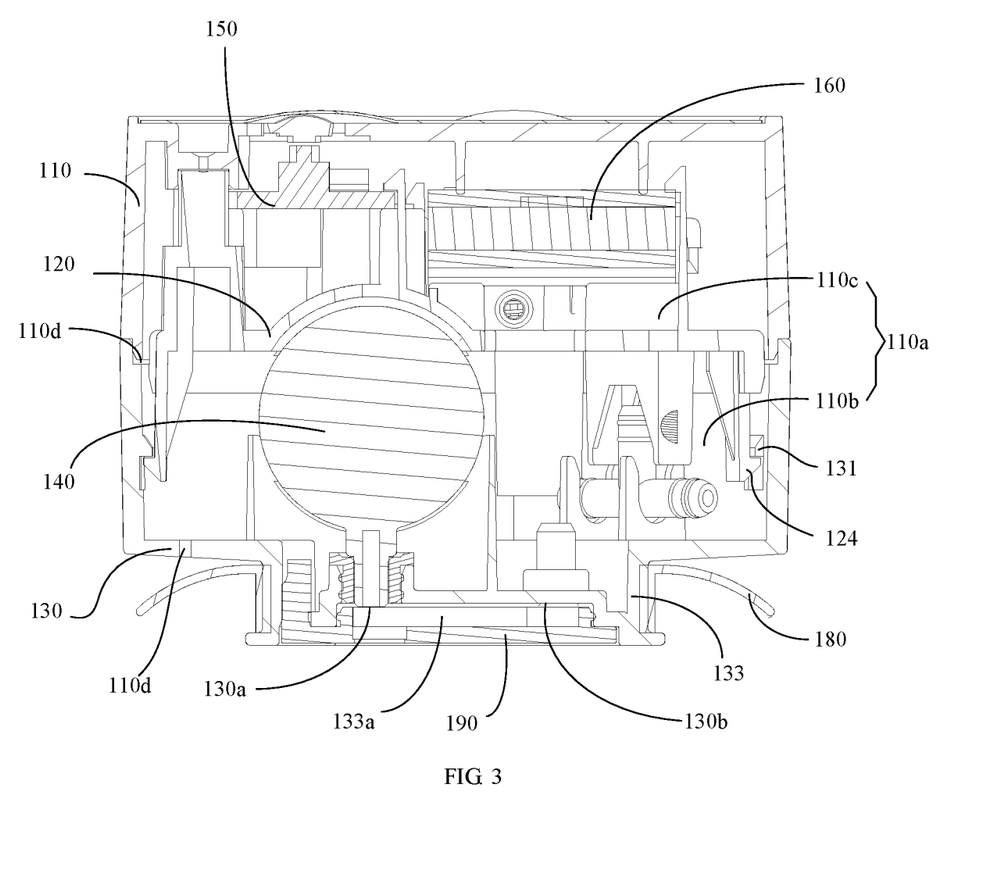
FIG. 3 is a schematic cross-sectional structural diagram of the vacuum pumping device in FIG. 1.
Figure 4:
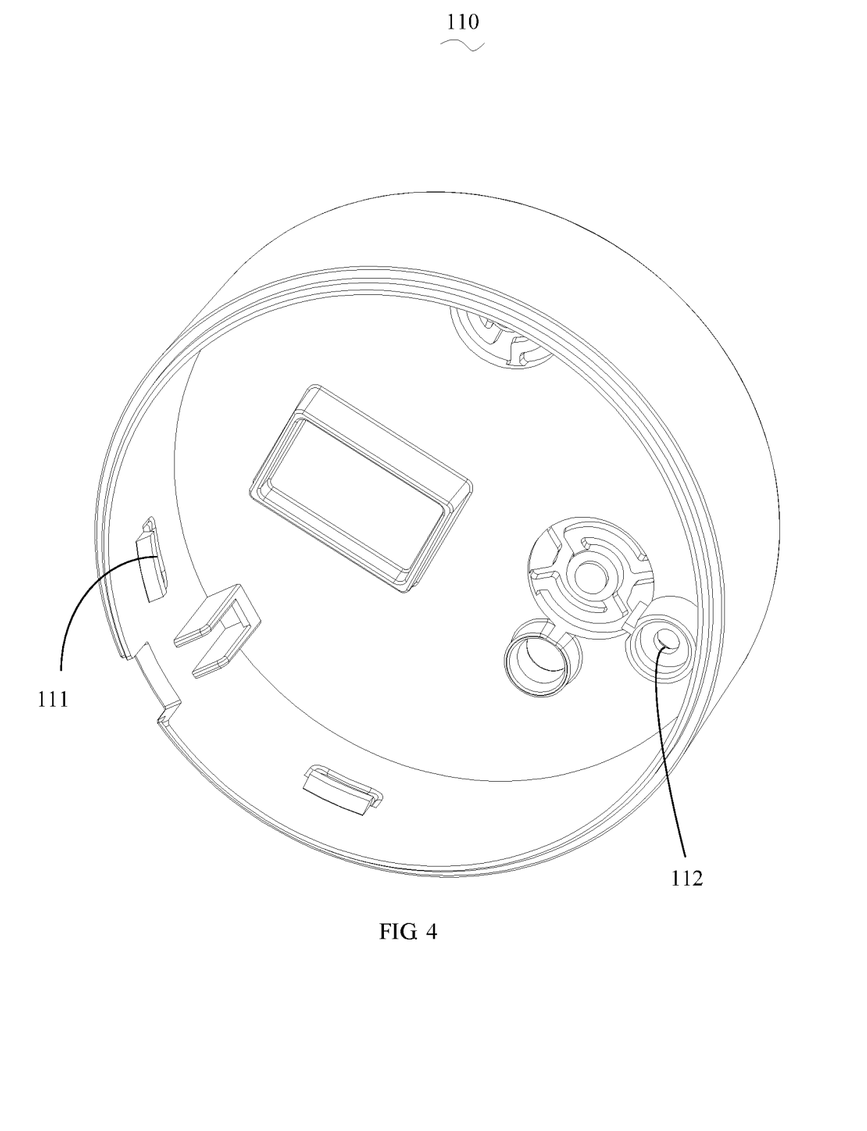
FIG. 4 is a schematic perspective structural diagram of an upper cover of the vacuum pumping device in FIG. 1.
Figure 5:
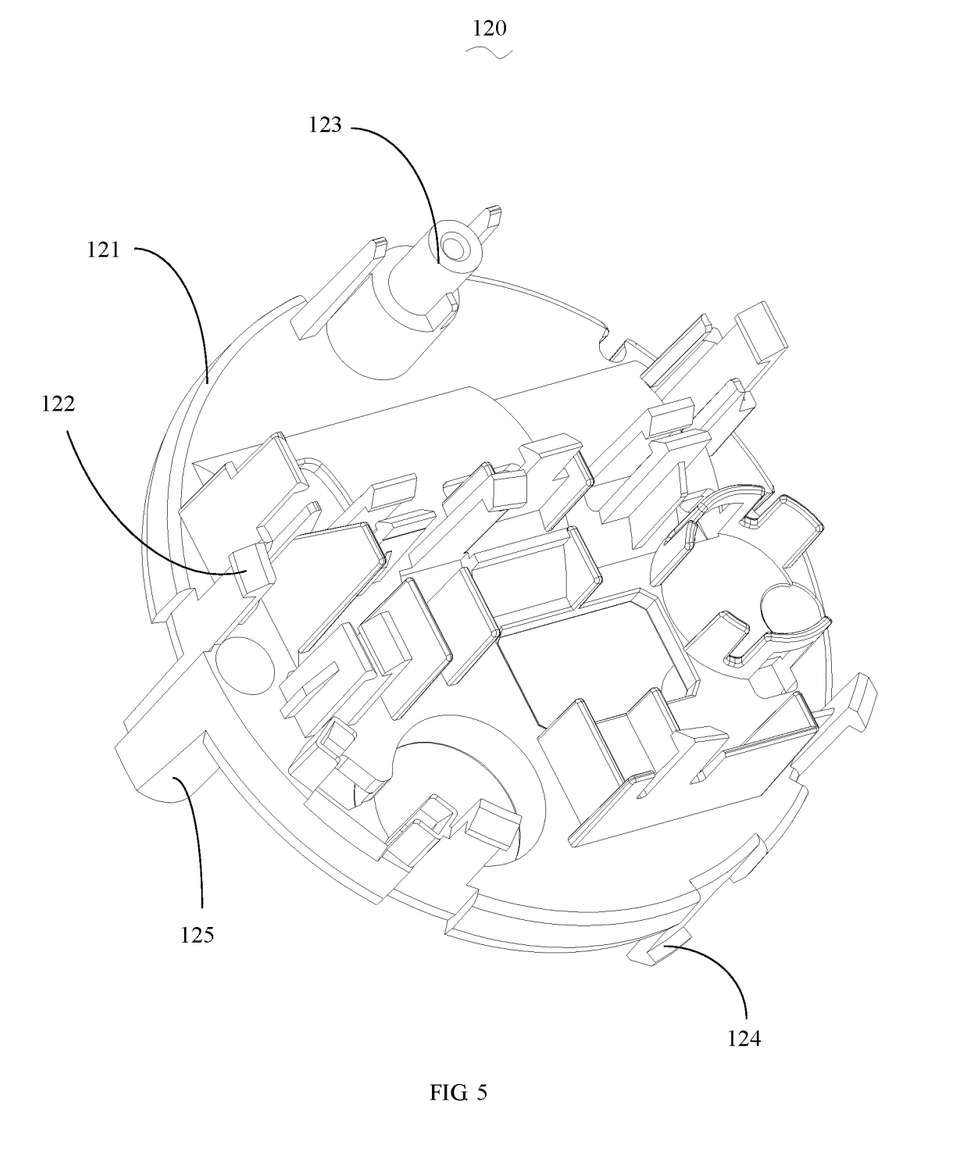
FIG. 5 is a schematic perspective structural diagram of a mounting support of the vacuum pumping device in FIG. 1.
Figure 6:
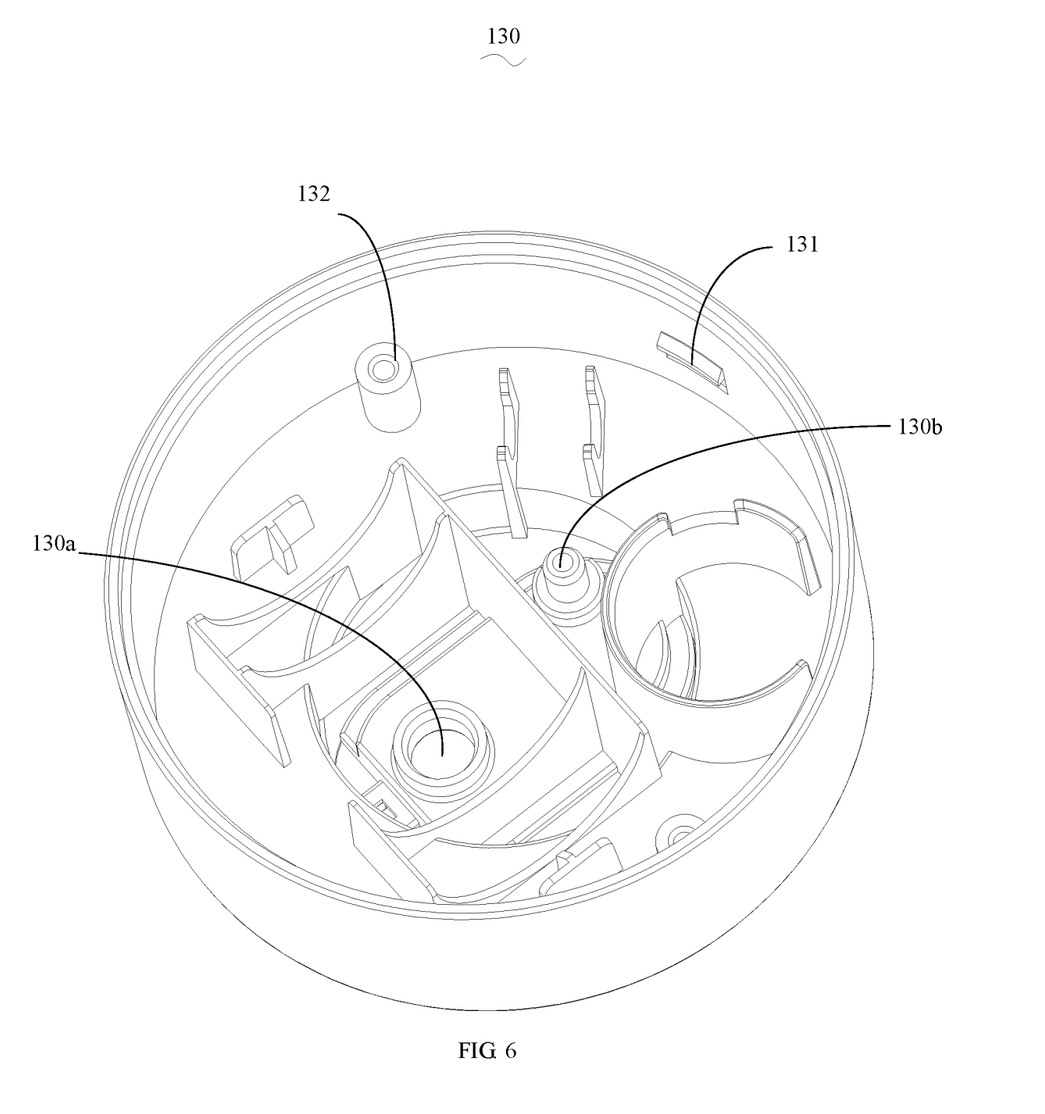
FIG. 6 is a schematic perspective structural diagram of a lower cover of the vacuum pumping device in FIG. 1.
Figure 7:
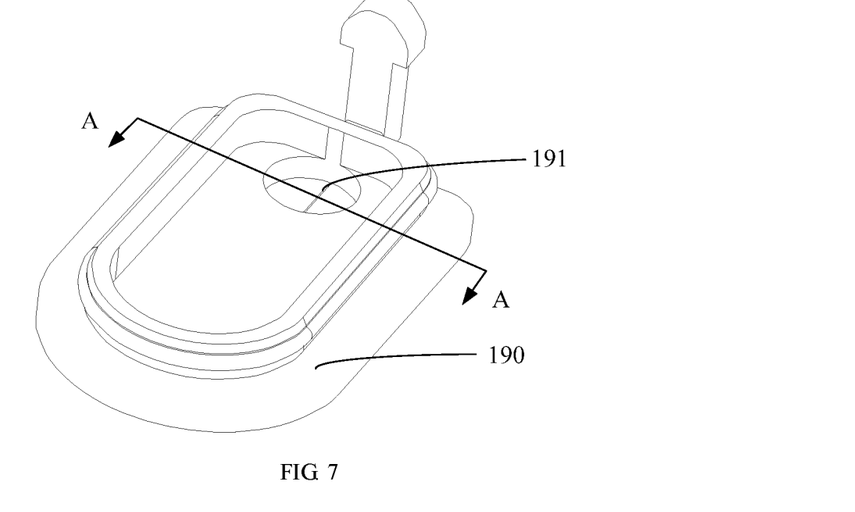
FIG. 7 is a schematic structural diagram of a cover plate of the vacuum pumping device according to the present disclosure.
Figure 8:
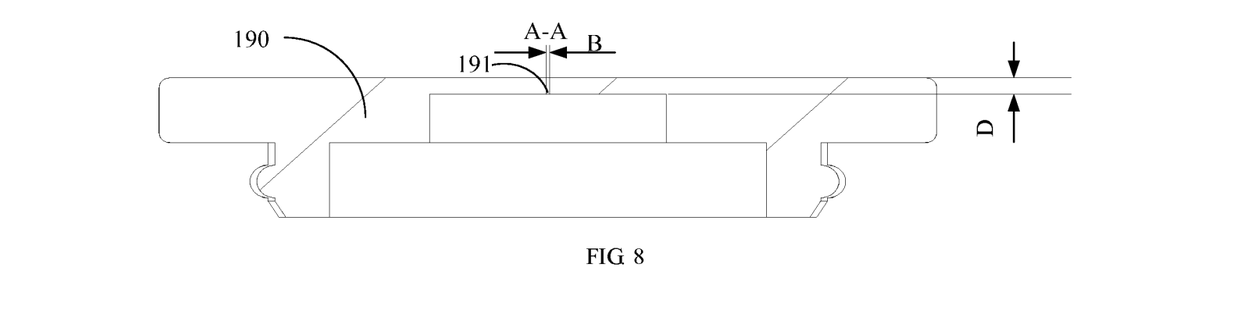
FIG. 8 is a schematic cross-sectional diagram taken along line A-A in FIG. 7.

In one embodiment, in order to block some large-volume ingredients outside the vacuum pumping device 100, please refer to FIG. 3, FIG. 7, and FIG. 8, a groove body (not shown) is formed on a surface of the lower cover 130 opposite to the upper cover 110 through a connecting ring 133. The evacuation hole 130a is defined on a bottom wall of the groove body. The lower cover 130 is also detachably connected with a cover plate 190. The cover plate 190 includes a screen hole 191 communicating with the isolation and storage cavity 133a.

In the present disclosure, the groove body is formed on a surface of the lower cover 130 opposite to the upper cover 110, the evacuation hole 130a is defined on a bottom wall of the groove body, the lower cover 130 may also be detachably connected with a cover plate 190 covering the opening of the groove body, the cover plate 190 includes a screen hole 191 communicating with the isolation and storage cavity 133a, and the cover plate 190 can not only block large-volume ingredients outside the vacuum pumping device 100, but also ensure that the container can communicate with the evacuation hole 130a through the screen hole 191 on the cover plate 190. Therefore, it is ensured that the air in the container can still pass through the evacuation hole 130a, and then be exhausted to the outside of the container by the action of the vacuum pump 140. Besides, the cover plate 190 can be detachably connected to the lower cover 130, and by removing the cover plate 190, the user can achieve the effect of conveniently cleaning the inner wall of the isolation and storage cavity 133a.

It should be appreciated that the screen hole 191 may be a circular hole, a square hole or a linear hole. The cover plate 190 can be screw-connected, snap-connected or magnetically connected to the groove body. When the cover plate 190 is buckled with the groove body, the cover plate 190 may be made of a flexible material, such as silicone.

Further, in order to better achieve the effect of blocking the ingredients, please specifically combine FIG. 7 and FIG. 8, the screen hole 191 is in an elongated shape, a width of the screen hole 191 is defined as B, and B is greater than 0 and less than or equal to 0.8 mm.

In the present disclosure, the screen hole 191 is in an elongated shape, a width B of the screen hole 191 is greater than 0 and less than or equal to 0.8 mm, and the screen hole 191 can block most of the ingredients. If B is greater than 0.8 mm, the width of the screen hole 191 is too wide, so that many ingredients can pass through the screen hole 191, and more ingredients are adhered to the inner wall of the isolation and storage cavity 133a, and then the evacuation hole 130a will be blocked after a period of time, which affects the normal use of the vacuum pumping device 100.

Referring to FIG. 8 again, a thickness of the area of the cover plate 190 provided with the screen hole 191 is defined as D, D is greater than 0.2 mm and less than or equal to 1.2 mm.

In the present disclosure, the thickness D of the area of the cover plate 190 provided with the screen hole 191 is greater than 0.2 mm and less than or equal to 1.2 mm, and the cover plate 190 can not only withstand an impact strength, but also ensure a better ventilation effect. If the thickness D of the area of the cover plate 190 provided with the screen hole 191 is less than or equal to 0.2 mm, the thickness of the cover plate 190 is small and it is difficult to ensure the strength of the cover plate 190 after the screen hole 191 is provided. If D is greater than 1.2 mm, the thickness of the cover plate 190 is thicker and affects the effect of sucking air in the container.

Further, a distance between the cover plate 190 and the bottom wall of the groove body is defined as L, L is greater than 1 mm and less than or equal to 10 mm.

In the present disclosure, the distance L between the cover plate 190 and the bottom wall of the groove body is greater than 1 mm and less than or equal to 10 mm, and the isolation and storage cavity 133a has a more suitable space to accommodate the adsorbed food materials, which can ensure that the food materials do not easily block the evacuation hole, and also ensure better air intake efficiency. If the distance L between the cover plate 190 and the bottom wall of the groove body is less than or equal to 1 mm, the depth of the cavity of the isolation and storage cavity 133a is relatively shallow, so that the food material quickly fills the cavity, requiring the user to frequently clean the inner wall of the isolation and storage cavity 133a. If the distance L between the cover plate 190 and the bottom wall of the groove body is greater than 10 mm, the depth of the cavity of the isolation and storage cavity 133a is relatively deep, so that after an amount of food is accumulated in the cavity, the efficiency of air extraction is affected.

Figure 9:
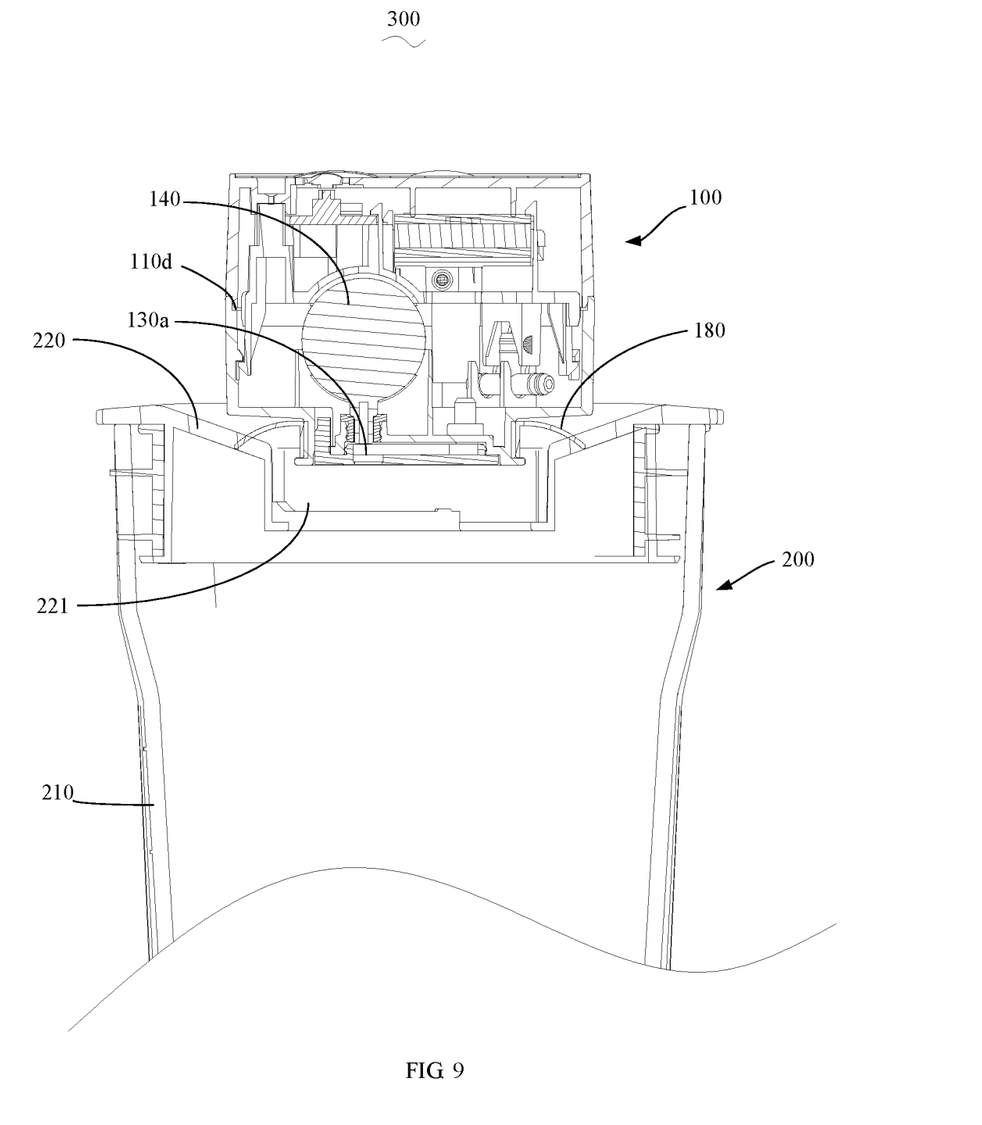
FIG. 9 is a cross-sectional structural diagram of a part of a food processor according to the present disclosure.

Referring to FIG. 9, the present disclosure further provides a food processor 300, including a stirring cup assembly 200. The stirring cup assembly 200 includes a cup body and a cup cover 220 covering an upper end of the cup body. The cup cover 220 includes an opening 221 communicating with an inner cavity of the cup body. The food processor 300 further includes a vacuum pumping device 100 detachably mounted on the cup cover 220. The specific structure of the vacuum pumping device refers to the above embodiments. The vacuum pumping device 100 is configured to communicate with the inner cavity of the cup body through the opening 221.

In the present disclosure, the food processor 300 includes the vacuum pumping device 100. The vacuum pumping device 100 can be directly placed on the cup cover 220 during use, and the entire assembly process is convenient. In order to further improve the convenience of the assembly process, in the present disclosure, a first magnetic piece (either a magnet or a magnetic metal) may be further fixed on the lower cover 130 and a second magnetic piece (either a magnet or a magnetic metal) may be fixed on the cup cover 220. The first magnetic piece and the second magnetic piece may be in a ring shape or provided in a plurality and arranged in a ring shape spaced. As such, when the vacuum pumping device 100 is placed, rapid positioning can be achieved through the magnetic adsorption of the first magnetic piece and the second magnetic piece, which is more convenient.

Further, an area of the opening 221 is defined as S1, an area surrounded by a connecting ring 133 on the lower cover 130 for mounting the sealing ring 180 is defined as S2, and an area surrounded by the sealing ring 180 is defined as S3, and S1 is greater than S2 and less than S3.

The opening 221 of the present disclosure may be circular or square. The projections of the opening 221, the connecting ring 133, and the sealing ring 180 are arranged on the same horizontal plane, so that it can ensure tight sealing and easier assembly when vacuuming.

Further, the cup cover 220 is provided with a groove. The opening 221 is defined at a bottom of the groove. A peripheral edge of the sealing ring 180 is abutted against a wall of the groove. The setting of the groove makes it easier to align and place the vacuum pumping device 100 during use. In addition, during the evacuation process, the sealing ring 180 is attracted to be closer to the opening periphery of the cup cover 220.

What is claimed is:

1. A food processor, comprising:
a stirring cup assembly, comprising:
a cup body comprising an inner cavity; and
a cup cover covering an upper end of the cup body, and comprising an opening communicating with the inner cavity of the cup body; and
a vacuum pumping device detachably mounted on the cup cover and comprising:
an upper cover;
a lower cover configured to cooperated with the upper cover to form a receiving cavity and comprising a connecting part at a lower portion of the lower cover, a wall of the receiving cavity defining an evacuation hole and an exhaust hole;
a mounting support located in the receiving cavity and connected to the upper cover and/or the lower cover;
a vacuum pump connected to the mounting support, and comprising:
an air inlet communicating with the evacuation hole; and
an air outlet communicating with the exhaust hole;
a control circuit board connected to the mounting support and electrically connected to the vacuum pump; and
a power supply module located in the receiving cavity and electrically connected to the control circuit board;
wherein the connecting part is configured to communicate with an inner cavity of the cup body through the opening.

2. The food processor of claim 1, wherein:
the vacuum pumping device further comprises a cover plate detachably connected with the lower cover and comprising a screen hole communicating with an isolation and storage cavity;
the lower cover comprises a groove body formed at a surface of the lower cover opposite to the upper cover and inside the connecting part, an opening of the groove body being covered by the cover plate to form the isolation and storage cavity; and the evacuation hole is formed at a bottom wall of the groove body.

3. The food processor of claim 1, wherein:

the vacuum pumping device further comprises a sealing ring, configured to:

cover and seal the stirring cup assembly to be evacuated, connect to the connecting part, and surround the exhaust hole; and an area of the opening is defined as S1;

an area surrounded by a connecting ring on the lower cover for mounting a sealing ring is defined as S2;

an area surrounded by the sealing ring is defined as S3; and

S1 is greater than S2 and less than S3.

4. The food processor of claim 1, wherein:

the cup cover comprises a groove;

the opening is formed at a bottom of the groove; and a peripheral edge of the sealing ring is abutted against a wall of the groove.

* * * * *

UNITED STATES PATENT AND TRADEMARK OFFICE
CERTIFICATE OF CORRECTION

| | | |
|---|---|---|
| PATENT NO. | : 11,692,536 B2 | Page 1 of 1 |
| APPLICATION NO. | : 16/644510 | |
| DATED | : July 4, 2023 | |
| INVENTOR(S) | : Jianfei Xu et al. | |

It is certified that error appears in the above-identified patent and that said Letters Patent is hereby corrected as shown below:

On the Title Page

At item (30) Foreign Application Priority Data Should read:
Mar. 7, 2018 (CN)...........201810190565.9
Mar. 7, 2018 (CN)...........201810191056.8

Signed and Sealed this
Fifteenth Day of August, 2023

Katherine Kelly Vidal
*Director of the United States Patent and Trademark Office*